(12) United States Patent
Zhao et al.

(10) Patent No.: US 11,451,326 B2
(45) Date of Patent: Sep. 20, 2022

(54) METHOD FOR DETERMINING TRANSMISSION MODE IN SIDELINK, TERMINAL APPARATUS, AND NETWORK APPARATUS

(71) Applicant: GUANGDONG OPPO MOBILE TELECOMMUNICATIONS CORP., LTD., Guangdong (CN)

(72) Inventors: Zhenshan Zhao, Guangdong (CN); Huei-Ming Lin, South Yarra (AU); Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/224,640

(22) Filed: Apr. 7, 2021

(65) Prior Publication Data
US 2021/0226726 A1    Jul. 22, 2021

Related U.S. Application Data

(63) Continuation of application No. PCT/CN2018/112453, filed on Oct. 29, 2018.

(51) Int. Cl.
*H04L 1/00*  (2006.01)
*H04L 12/24* (2006.01)
(Continued)

(52) U.S. Cl.
CPC ........ *H04L 1/0025* (2013.01); *H04L 41/0803* (2013.01); *H04W 92/18* (2013.01)

(58) Field of Classification Search
None
See application file for complete search history.

(56) References Cited

U.S. PATENT DOCUMENTS

2016/0044737 A1   2/2016  Kwon
2016/0323869 A1*  11/2016 Xu .................... H04W 72/0473
(Continued)

FOREIGN PATENT DOCUMENTS

CN        105554689 A     5/2016
CN        106303899 A     1/2017
(Continued)

OTHER PUBLICATIONS

Huawei, Hisilicon, "Discussion on delay and interruption requirements for V2X CA in mode 3", 3GPP TSG-RAN WG4 Meeting #86bis R4-1804796, Apr. 20, 2018.
(Continued)

*Primary Examiner* — Hong Shao
(74) *Attorney, Agent, or Firm* — Perkins Coie LLP

(57) ABSTRACT

The present disclosure relates to a method for determining a transmission mode of a sidelink, a terminal apparatus, and a network apparatus. The method includes: a first terminal apparatus determining a first transmission mode from multiple transmission modes; and the first terminal apparatus performing, by adopting the first transmission mode, sidelink communications with other terminal apparatuses. The method for determining a transmission mode of a sidelink, the terminal apparatus, and the network apparatus in the present disclosure enable a terminal apparatus to adopt a suitable transmission mode for sidelink communications.

26 Claims, 4 Drawing Sheets

(51) Int. Cl.
*H04L 41/0803* (2022.01)
*H04W 92/18* (2009.01)

(56) References Cited

U.S. PATENT DOCUMENTS

| | | | |
|---|---|---|---|
| 2017/0150501 A1* | 5/2017 | Park | H04W 72/0446 |
| 2017/0171837 A1* | 6/2017 | Chen | H04W 72/04 |
| 2017/0303240 A1 | 10/2017 | Basu et al. | |
| 2019/0223231 A1 | 7/2019 | Muraoka et al. | |
| 2020/0053835 A1* | 2/2020 | Ye | H04L 1/08 |

FOREIGN PATENT DOCUMENTS

| | | |
|---|---|---|
| CN | 107846434 A | 3/2018 |
| EP | 3101978 A1 | 12/2016 |
| EP | 3200557 A1 | 8/2017 |
| EP | 3273634 A1 | 1/2018 |
| RU | 2657863 C1 | 6/2018 |
| WO | 2016047261 A1 | 3/2016 |
| WO | 2016186059 A1 | 11/2016 |
| WO | 2018047401 A1 | 3/2018 |

OTHER PUBLICATIONS

International Search Report dated Jul. 30, 2019 cited in PCT/CN2018/112453.
EPO, Extended European Search Report for European Application No. 18938415.9, dated Jul. 14, 2021. 8 pages.
Examination Report No. 1 for Australian Application No. 2018447431 dated Nov. 19, 2021. 3 pages.
Office Action for Russian Application No. 2021112486 dated Sep. 28, 2021. 10 pages with English translation.
Examination Report for Indian Application No. 202127022641 dated Feb. 25, 2022. 5 pages with English translation.
Examiner's Report for Canadian Application No. 3116599 dated Apr. 25, 2022. 4 pages.
Notice of Reasons for Refusal for Japanese Application No. 2021-546409 dated May 6, 2022. 8 pages with English translation.
Notification of Reason for Refusal for Korean Application No. 10-2021-701982 dated May 20, 2022. 10 pages with English translation.

* cited by examiner

METHOD FOR DETERMINING TRANSMISSION MODE IN SIDELINK, TERMINAL APPARATUS, AND NETWORK APPARATUS

CROSS-REFERENCE TO RELATED APPLICATION

The present application is a continuation application of International PCT Application No. PCT/CN2018/112453, filed on Oct. 29, 2018, the entire content of which is hereby incorporated by reference.

TECHNICAL FIELD

The present disclosure relates to the communication field, in particular to a method for determining a transmission mode in a sidelink, a terminal device and a network device.

BACKGROUND

A Vehicle-to-Everything system is a sidelink (SL) transmission technology based on Long Term Evolution (LTE) device-to-device (D2D) communication. Different from a mode in a conventional LTE system in which communication data is received or sent by using a base station, the vehicle networking system adopts a mode of Device-to-Device direct communication, and therefore the system has higher spectrum efficiency and lower transmission latency.

In a New Radio (NR) vehicle to everything (V2X) system, multiple transmission modes are introduced, for example, transmission resources may be allocated to a terminal device through a network device; or, the terminal device autonomously selects resources from a pre-configured or network-configured resource pool, wherein the autonomously selected resources may be selected randomly or by sensing; or, the terminal device may further assist other terminal devices in selecting resources, for example, a first terminal device sends auxiliary information to a second terminal device, the auxiliary information includes available time-frequency resource information, channel measurement information and channel quality information, so that the second terminal device selects transmission resources based on the auxiliary information.

For the multiple transmission modes introduced in the NR-V2X system, how to determine a terminal device's own transmission mode is a problem to be solved.

SUMMARY

Implementations of the present disclosure provide a method for determining a transmission mode in a sidelink, a terminal device and a network device, which can realize that the terminal device adopts an appropriate transmission mode for a sidelink communication.

In a first aspect, a method for determining a transmission mode in a sidelink is provided, including: determining, by a first terminal device, a first transmission mode in multiple transmission modes; and adopting, by the first terminal device, the first transmission mode to perform a sidelink communication with another terminal device.

In a second aspect, a method for determining a transmission mode in a sidelink is provided, including: receiving, by a first terminal device, a first message, wherein the first message includes first information, and the first information includes at least one piece of the following information: a transmission mode adopted by the first terminal device for performing a sidelink communication, a group identifier of a terminal device group where the first terminal device is located, and group head information of the terminal device group, wherein the group head information is used for indicating a group head in the terminal device group, and the group head is a terminal device with a resource coordination or allocation function in the terminal device group; determining a first transmission mode in multiple transmission modes according to the first message; and sending first configuration information to the first terminal device, wherein the first configuration information is used for indicating the first terminal device to adopt the first transmission mode to perform the sidelink communication with another terminal device.

In a third aspect, a terminal device is provided. The terminal device includes units for implementing the method in the first aspect or various implementations thereof. Specifically, the terminal device includes function modules for performing the method in the above first aspect or various implementations thereof.

In a fourth aspect, a network device is provided. The network device includes units for performing the method in the second aspect or various implementations thereof. Specifically, the network device includes functional modules for performing the method in the above second aspect or various implementations thereof.

In a fifth aspect, a terminal device is provided. The terminal device includes a processor and a memory. The memory is configured to store a computer program, and the processor is configured to call and run the computer program stored in the memory to execute the method in the first aspect or various implementations thereof.

In a sixth aspect, a network device is provided. The network device includes a processor and a memory. The memory is configured to store a computer program, and the processor is configured to call and run the computer program stored in the memory to execute the method in the second aspect or various implementations thereof.

In a seventh aspect, a chip is provided for implementing the method in any one of above first to second aspects or the method in various implementations thereof. Specifically, the chip includes a processor configured to call and run a computer program from a memory and a device having the chip installed therein executes the method in any one of the above first to second aspects or in various implementations thereof.

In an eighth aspect, a computer-readable storage medium is provided for storing a computer program that enables a computer to execute the method in any one of the above first to second aspects or various implementations thereof.

In a ninth aspect, a computer program product is provided, including computer program instructions that enable a computer to execute the method in any one of the above first to second aspects or various implementations thereof.

In a tenth aspect, a computer program is provided which, when being run on a computer, enables a computer to execute the method in any one of the above first to second aspects or various implementations thereof.

According to the above technical solutions, a network device or terminal device configures transmission modes for one or more terminal devices when performing a sidelink, especially for multiple terminal device in a unicast or multicast communication, an appropriate transmission mode may be configured according to actual applications, thereby avoiding resource conflicts and improving a resource utilization rate and a data transmission efficiency.

DETAILED DESCRIPTION

The technical solution in implementations of the present disclosure will be described below with reference to the drawings in implementations of the present disclosure. It is apparent that the implementations described are just some implementations of the present disclosure, but not all implementations of the present disclosure. According to the implementations of the present disclosure, all other implementations achieved by a person of ordinary skill in the art without paying an inventive effort shall fall within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, or a 5G system, etc.

Figure 1:
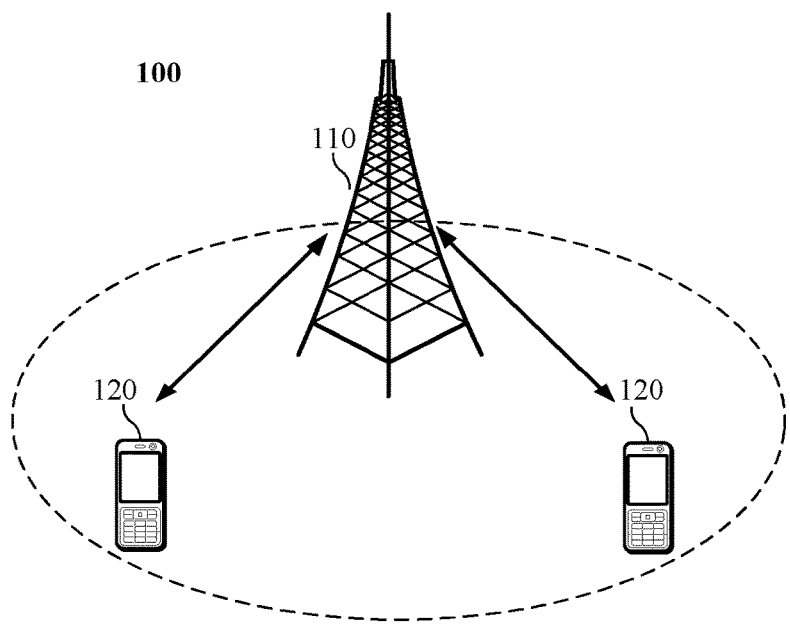
FIG. 1 is a schematic diagram of an architecture of a communication system according to an implementation of the present disclosure.

Illustratively, a communication system 100 applied in an implementation of the present disclosure is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network device may be a mobile switch center, a relay station, an access point, a vehicle-mounted device, a wearable device, a hub, a switch, a bridge, a router, or a network side device in a 5G network, or a network device in a future evolved Public Land Mobile Network (PLMN), etc.

The communication system 100 also includes at least one terminal device 120 located within the coverage area of the network device 110. As used herein, the term "terminal device" includes, but not limited to, a device configured to connect via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or an apparatus, of another communication terminal, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal capable of combining with a cellular wireless telephone and data processing, faxing, and data communication capabilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. Optionally, the terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMN), or the like.

Optionally, Device to Device (D2D) communication may be performed between the terminal devices 120.

Optionally, the 5G system or 5G network may be referred to as a New Radio (NR) system or a NR network.

FIG. 1 shows one network device and two terminal devices as an example. Optionally, the wireless communication system 100 may include multiple network devices, and other quantity of terminal devices may be included within coverage area of each network device, and the implementations of the present disclosure are not limited thereto.

Optionally, the communication system 100 may include other network entities such as a network controller, and a mobile management entity, and the implementations of the present disclosure are not limited thereto.

It should be understood that, a device with a communication function in a network/system in the implementation of the present disclosure may be referred to as a communication device. The communication system 100 shown in FIG. 1 is taken as an example, the communication device may include a network device 110 and terminal devices 120 which have communication functions, and the network device 110 and the terminal devices 120 may be the specific devices described above, which will not be described here again. The communication device may further include other devices in the communication system 100, such as network controllers, mobile management entities, and other network entities, and the implementations of the present disclosure are not limited thereto.

It should be understood that the terms "system" and "network" are often used interchangeably in this specification. The term "and/or" used herein is merely an association relation describing associated objects, indicating that there may be three relations, for example, A and/or B may indicate three cases: A alone, A and B, and B alone. In addition, the symbol "/" herein generally indicates that objects before and after the symbol "/" have an "or" relation.

Figure 2:
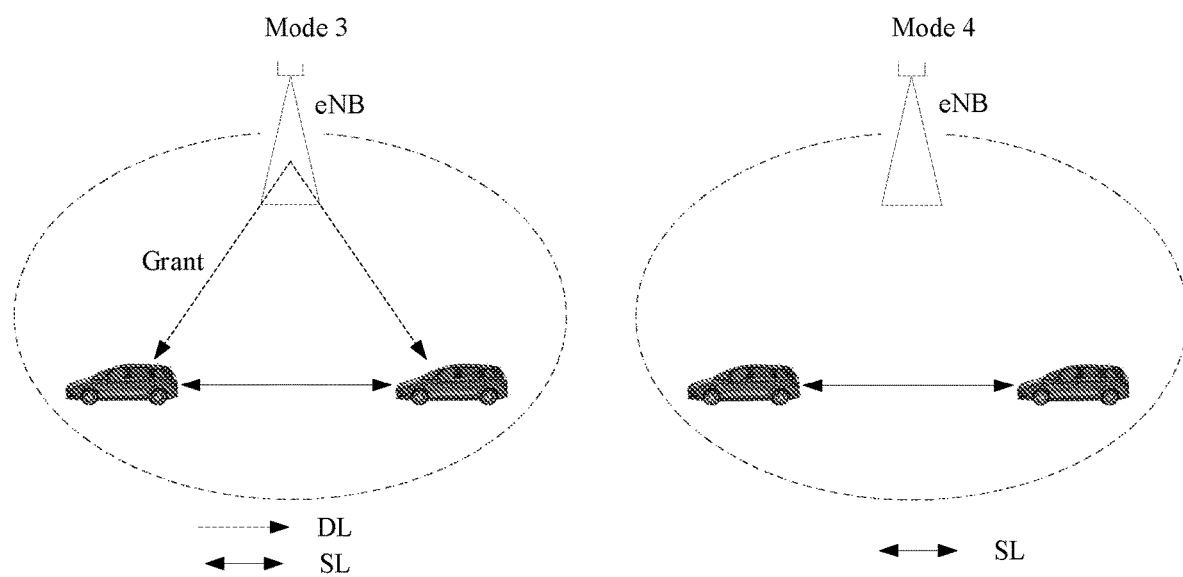
FIG. 2 is a schematic diagram of a sidelink system according to an implementation of the present disclosure.

In Release 14 (Rel-14) of the 3rd generation partnership project (3GPP), the V2X technology is standardized, and two transmission modes are defined: mode 3 and mode 4, wherein FIG. 2 shows a schematic diagram of two transmission modes in a V2X system according to an implementation of the present disclosure.

As shown in FIG. 2, mode 3 on the left indicates that transmission resources of a vehicle terminal are allocated by a base station through a downlink (DL), and the vehicle terminal transmits data on the sidelink according to the resources allocated by the base station; the base station may allocate to the terminal a resource for a single transmission or a resource for a semi-static transmission.

As shown in FIG. 2, mode 4 on the right indicates that a vehicle terminal adopts a transmission mode of sensing plus reservation. The vehicle terminal acquires a set of available transmission resources in a resource pool by sensing, and the terminal randomly selects a resource from the set for data transmission. Since services in the V2X have a periodic feature, the terminal usually adopts a semi-static transmission mode, that is, after selecting a transmission resource, the terminal will continuously use the resource in multiple transmission periods, thus reducing probabilities of resource re-selection and resource conflict. The terminal will carry information of a resource reserved for next transmission in the control information of a current transmission, so that other terminals can determine whether the resource is reserved and used by the user by detecting the control information of the user, thus achieving a purpose of reducing resource conflicts.

In the NR-V2X system, similar to the above, multiple transmission modes are introduced, for example, mode 1 and mode 2 may be included, wherein mode 1 is that a network device allocates transmission resources for the terminal, which is similar to mode 3 in LTE-V2X, and the terminal device adopts the transmission resources allocated by the network device; however, in mode 2, the terminal device selects the transmission resources, and mode 2 is divided into several sub-modes, for example, the following modes may be specifically included.

1. Mode 2a: a terminal device selects transmission resources independently, which is similar to the mode 4 in the LTE-V2X mentioned above. For example, the terminal selects resources independently from a pre-configured or network-configured resource pool, and may select resources randomly or by sensing.

2. Mode 2b: a terminal assists other terminals in selecting resources; for example, a first terminal sends auxiliary information to a second terminal, and a terminal device receiving the auxiliary information may determine transmission resources according to the auxiliary information, wherein the auxiliary information may include one or more of the following information: available time-frequency resource information, available transmission resource set information, channel measurement information and channel quality information, such as Channel State Information (CSI), Channel Quality Indicator (CQI), Precoding Matrix Indicator (PMI), rank indication (RI), Reference Signal Receiving Power (RSRP), Reference Signal Receiving Quality (RSRQ), Received Signal Strength Indicator (RSSI), interference information and path loss information.

3. Mode 2c: a terminal device selects resources from transmission resources configured for it. For example, a network device may configure transmission resources for each terminal in a group of terminal devices, wherein the transmission resource for each terminal device may be same or different. When any terminal has a sidelink data transmission, the transmission resource configured by a network device may be used for data transmission. For example, when the network device configures the same resources for each terminal device in a group of terminal devices, the terminal device that needs to perform the sidelink data transmission may select available resources from the configured resources by manners such as sensing; or, the network device may configure different transmission resources for each terminal device in a group of terminal devices, and the terminal device that needs to perform the sidelink data transmission may select available resources from the resources configured therefor.

Mode 2d: a first terminal device allocates transmission resources for a second terminal device. For example, for multiple terminal devices in a multicast link, if the first terminal device is a group head in the multicast link and the second terminal device is a group member of the group, the first terminal device may directly allocate time-frequency resources for the second terminal device for a downlink transmission.

For multiple transmission modes in the NR V2X, how one terminal determines its own transmission mode is a problem that needs to be solved.

In mode 2b or mode 2d, the terminal device is usually in a certain unicast or multicast link, and other terminal device (such as a group head in group communication or an opposite terminal device in unicast communication) allocates transmission resources for the terminal device, or other terminal sends auxiliary information which is used for the terminal device to select resources. In other transmission modes, the terminal device mainly relies on the transmission resources allocated by the network device for performing the sidelink communication.

Specifically, if the terminal device is outside cell coverage and does not perform unicast or multicast communication with other terminal devices, the terminal device only performs broadcast communication, and the terminal device can work in the above mode 2a. When the terminal device and other terminal device form a unicast link or a multicast link, they can perform unicast communication or multicast communication with other terminal devices. At this time, the terminal device may further work in mode2b or mode2d.

For any terminal device, if the terminal device is currently working in mode 1, but the terminal device performs unicast communication or multicast communication at the same time, other terminal device of unicast communication or multicast communication may also adopt mode 1, that is, all transmission resources of the unicast communication and the multicast communication are determined by the network device. However, if each group member in multicast communication are not in same one cell and there is no resource coordination between cells, then the network device of each group member may cause transmission resource conflicts when allocating transmission resources to the respective group members, that is, the transmission resources of terminal devices in different cells conflict with each other. At this time, the terminal devices may adopt mode 2b or mode 2d, for example, the group head allocates transmission resources to each group member, thus avoiding transmission interference among users in the group. Then, the group members need to send the information of the unicast link or multicast link where they are currently located to the group head or the network device, and the network decides the transmission mode of the terminal device, or the network device decides whether the terminal device needs to switch modes, so as to avoid conflicts. Therefore, an implementation of the present disclosure provides a method for determining a transmission mode in a sidelink, so that the terminal device may switch a transmission mode, thus being able to deal with various scenarios and avoiding resource conflicts.

Figure 3:
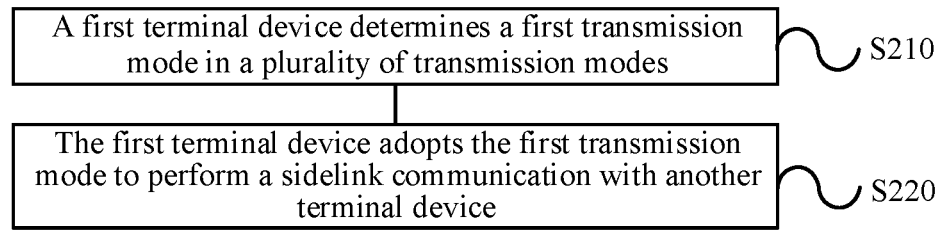
FIG. 3 is a schematic diagram of a method for determining a transmission mode in a sidelink according to an implementation of the present disclosure.

FIG. 3 shows a schematic flow chart of a method 200 for determining a transmission mode in a sidelink according to an implementation of the present disclosure, the method 200 may be performed by any terminal device, which is called a first terminal device here. Specifically, the first terminal device may perform a sidelink communication with another terminal device, for example, the first terminal device may be any terminal device shown in FIG. 1 or FIG. 2. As shown in FIG. 3, the method 200 includes S210-S220. In S210, the first terminal device determines a first transmission mode in multiple transmission modes; in S220, the first terminal device adopts the first transmission mode to perform a sidelink communication with another terminal device.

Specifically, in S210, the first terminal device may determine the first transmission mode in the multiple transmission modes through multiple ways. For example, the first terminal device determines the first transmission mode through configuration of a network device, that is, the first terminal device receives configuration information sent by the network device, wherein the configuration information indicates the first transmission mode, and the first terminal device determines the first transmission mode in the multiple transmission modes according to the first configuration information, or, the first terminal device may further determine the first transmission mode in the multiple transmission modes according to its own related messages or with reference to information of another terminal device; or, the first terminal device may further receive configuration information sent by another terminal device, wherein the configuration information is used for indicating the first transmission mode, so that the first terminal device may determine the first transmission mode in the multiple transmission modes according to the configuration information. Implementations of the present disclosure are not limited to this.

In S220, the first terminal device adopts the first transmission mode determined in S210 to perform the sidelink communication with another terminal device. In the above, before determining the first transmission mode in S210, the first terminal device may adopt a second transmission mode to perform the sidelink communication with another terminal device. After determining the first transmission mode, the first terminal device updates the transmission mode used for the sidelink communication from the second transmission mode to the first transmission mode.

It should be understood that the second transmission mode may be same as or different from the first transmission mode. If the first transmission mode is same as the second transmission mode, the first terminal device does not change the transmission mode in S220. If the first transmission mode is different from the second transmission mode, the first terminal device changes the transmission mode from the second transmission mode to the first transmission mode in S220.

It should be understood that the first transmission mode or the second transmission mode may be any type of transmission mode, for example, the above-mentioned mode 1, or any one of the modes 2a-2d in the mode 2, and implementations of the present disclosure are not limited to this.

The method 200 for determining the transmission mode in the sidelink according to an implementation of the present disclosure will be described in detail with reference to different implementations.

Implementation one: the first terminal device is configured through the network device to adopt the first transmission mode.

Specifically, the first terminal device receives the first configuration information sent by the network device, wherein the first configuration information is used for indicating the first transmission mode, the first terminal device determines the first transmission mode in multiple transmission modes according to the first configuration information, and adopts the first transmission mode to perform the sidelink communication with other terminal devices.

Optionally, the first configuration information sent by the network device received by the first terminal device may be carried in, for example, broadcast information, Radio Resource Control (RRC) signaling or downlink control information, and implementations of the present disclosure are not limited to this.

Optionally, the first configuration information may further include at least one piece of the following information: group identification information of a terminal device group where the first terminal device is located, type information of multicast communication or broadcast communication, Radio Access Technology (RAT) class indication information, and Quality of Service (QoS) attribute information.

Since the first terminal device may have one or more groups of multicast communications at the same time or have a unicast communication and a multicast communication at the same time, the first configuration information sent by the network device to the first terminal device may include not only the first transmission mode, but also the group identification information of the terminal device group where the first terminal device is located, so that the first terminal device may determine which terminal device group adopts the first transmission mode to perform the sidelink communication, wherein the first terminal device may adopt the same or different transmission modes in different terminal device groups.

Optionally, the first configuration information may further include the types of unicast communication, multicast communication or broadcast communication, that is, the first configuration information sent by the network device to the first terminal device indicates that the first terminal device adopts the first transmission mode to perform the sidelink communication during the unicast communication, multicast communication or broadcast communication. For example, if the type information indicated by the first configuration information is the multicast communication, then it may be specifically determined which multicast link adopts the first transmission mode to perform the sidelink communication with reference to the identification information of the terminal device group included in the first configuration information. For another example, if the type indicated by the first configuration information is the broadcast communication, the first terminal device may adopt the first transmission mode to perform the sidelink communication with other terminal devices when determining the broadcast communication.

Optionally, the first configuration information may further include RAT class indication information, for example, if the RAT class indication information may be used for indicating LTE or NR, then the first terminal device determines to adopt the first transmission mode to perform the sidelink communication in the LTE system or NR system according to the first configuration information, wherein the first terminal device may adopt the same or different transmission modes to perform the sidelink communication in the LTE system and NR system.

Optionally, the first configuration information may further include QoS attribute information, for example, the QoS attribute information may be used for indicating QoS levels, wherein different levels may correspond to the same or different transmission modes, so that the first terminal device may determine the transmission mode under a certain QoS level as the first transmission mode.

It should be understood that the method 200 may further include: the first terminal device sends a first message to the network device. Specifically, the first message may be sent before the network device sends the first configuration information, so that the network device may determine the first transmission mode according to the first message, or, the first message may be sent after the network device sends the first configuration information, so that the network device may re-determine the transmission mode according to the first message, so that the first terminal device may update the current first transmission mode. For convenience of explanation, taking a case in which the first terminal device sends the first message to the network device before the network device sends the first configuration information as an example, the first message is used for the network device to determine the first transmission mode. It should be understood that the first message sent by the first terminal device to the network device may be carried in, for example, uplink control information, Media Access Control Control Element (MAC CE) or RRC signaling, and implementations of the present disclosure are not limited to this.

In the above, the first message may include related information of the first terminal device, for example, the first message may include first information, wherein the first information includes at least one piece of the following information: the transmission mode adopted by the first terminal device for performing the sidelink communication, group identifier of the terminal device group where the first terminal device is located, and group head information of the terminal device group.

It should be understood that the transmission mode adopted by the first terminal device for performing the sidelink communication included in the first information refers to the transmission mode adopted when sending the first information. For example, if the first information is sent before the network device configures the first transmission mode, the transmission mode indicated in the first information is a transmission mode currently used by the first terminal device, which may be the first transmission mode or other transmission modes, if the first information is sent after the network device configures the first transmission mode, the transmission mode indicated in the first information is a transmission mode currently used by the first terminal device, that is, the first transmission mode.

Optionally, the transmission mode adopted by the first terminal device for performing the sidelink communication included in the first information is the transmission mode adopted by the first terminal device in the terminal device group. The same terminal device may adopt same or different transmission modes when it is located in different terminal device groups. Therefore, the transmission mode adopted by the terminal device for performing the sidelink communication described in an implementation of the present disclosure is the transmission mode adopted by the terminal device in its own terminal device group. For example, the network device may configure, for the first terminal device, a transmission mode for performing the sidelink communication in a certain terminal device group.

It should be understood that the group head information in the first information may be used for indicating the group head in the terminal device group, wherein the group head is a terminal device with resource coordination, control, management or allocation function in the terminal device group. For example, if the first terminal device is not the group head in the terminal device group, the group head information may include identification information of the group head in the terminal device group; or, if the first terminal device is the group head in the terminal device group, the group head information may be used for indicating that the first terminal device is the group head in the terminal device group, or the group head information may further include identification information of the group head in the terminal device group where the first terminal device is located, and the network device determines that the group head is the first terminal device.

It should be understood that the terminal device group in an implementation of the present disclosure refers to the unicast or multicast link where the first terminal device is located, or if the first terminal device does not belong to any unicast or multicast link, for example, the first terminal device performs a broadcast communication, the terminal device group may only include the first terminal device. For example, the terminal device group may include two terminal devices, and the two terminal devices form a unicast link and perform unicast communication; or, the terminal device group may further include more than two terminal devices, and the multiple terminal devices form a multicast link and perform multicast communication, and implementations of the present disclosure are not limited to this. For convenience of description and conciseness, both unicast link and multicast link are referred to as terminal device groups in the present disclosure, which will not be described again.

Optionally, when the terminal device group includes more than two terminal devices, the group identifier of the terminal device group is identification information for identifying the terminal device group; when the terminal device group includes two terminal devices, the group identifier of the terminal device group may be the identification information for identifying the terminal device group, or the group identifier of the terminal device group may be identification information of the other terminal device except the first terminal device.

Optionally, the network device may receive first information sent by the first terminal device, wherein the first information is related information of the first terminal device, and the network device may further receive messages sent by another terminal device, for example, the network device may further receive second information sent by a second terminal device, and the second terminal device may be another terminal device except the first terminal device, for example, the second terminal device may be any terminal device belonging to the same terminal device group as the first terminal device, and the second information may include related information of the second terminal device, for example, the second information may include identification information of the second terminal device, transmission mode adopted by the second terminal device for performing a sidelink communication and first indication information, wherein the first indication information is used for indicating cell information or coverage information corresponding to the second terminal device. Therefore, the network device may receive information of one or more terminal devices, and implementations of the present disclosure are not limited to this.

Optionally, the network device receives the first message sent by the first terminal device, and the first message may further include related information of one or more other terminal devices, that is, the network device receives the related information of other terminal devices through the first terminal device. For example, if the first terminal device is the group head in the terminal device group, the first terminal device may send the information of other terminal devices in the terminal device group to the network device. Specifically, taking the first terminal device sending related information of any terminal device as an example, the first message may include second information, wherein the second information may include at least one piece of the following information: identification information of the second terminal device, transmission mode adopted by the second terminal device for performing the sidelink communication, and the first indication information, wherein the second terminal device is a terminal device other than the first terminal device, for example, the second terminal device may be any terminal device belonging to the same terminal device group as the first terminal device, and the first indication information is used for indicating the cell information or coverage information corresponding to the second terminal device.

It should be understood that the method 200 may further include: the first terminal device receives the second information sent by the second terminal device, so that the first terminal device sends the second information to the network device. Optionally, the second information sent by the second terminal device to the first terminal device may be carried in a sidelink transmission channel, for example, the sidelink transmission channel may be a Physical Sidelink Control Channel (PSCCH) or a Physical Sidelink Shared Control Channel (PSSCH).

The above-mentioned first indication information may be used for indicating cell information or coverage information corresponding to the second terminal device. For example, if the second terminal device is located outside the cell coverage area, the first indication information is used for indicating that the second terminal device is located outside the cell coverage area.

For another example, if the second terminal device is located within the cell coverage area, the first indication information includes the cell identification information of the cell where the second terminal device is located, so that the network device may determine the cell where the second terminal device is located.

For another example, if the second terminal device is located outside the coverage area of the cell where the first terminal device is located, the first indication information is used for indicating that the second terminal device is located outside the coverage area of the cell where the first terminal device is located and/or the first indication information includes cell identification information of the cell where the second terminal device is located. Specifically, if the second terminal device is located outside the cell coverage area, that is, outside the coverage area of the cell where the first terminal is located, the first indication information may be used for indicating that the second terminal device is located outside the coverage area of the cell where the first terminal device is located or outside the cell coverage area. If the second terminal device is located within the cell coverage area but outside the coverage area of the cell where the first terminal is located, the first indication information may be used for indicating that the second terminal device is located outside the coverage area of the cell where the first terminal device is located, or the first indication information may further include the cell identification information of the cell where the second terminal device is located, so that the network device may determine the cell where the second terminal device is located.

For another example, if the second terminal device is located within the coverage area of the cell where the first terminal device is located, the first indication information is used for indicating that the second terminal device is located in the cell where the first terminal device is located, or, the first indication may further include the cell identification information of the cell where the second terminal device is located, so that the network device may determine the cell where the second terminal device is located.

Optionally, the cell identification information may be one piece of the following information: cell identifier (cell-ID), carrier frequency information of the cell, carrier information of the cell, and Public land mobile network (PLMN) information.

It should be understood that the network device determines the transmission modes of all or part of the one or more terminal devices according to the received related information of the one or more terminal devices. Specifically, taking the above first terminal device and the second terminal device as an example, the network device receives the related information of the two terminal devices, for example, the network device may receive the first information and the second information, and according to the first information and the second information, transmission modes may be configured for the first terminal device and/or the second terminal device. Here, assuming that the network device has configured transmission modes for both the first terminal device and the second terminal device, the network device may send first configuration information to the first terminal device, wherein the first configuration information is used for indicating the first terminal device to adopt the first transmission mode to perform the sidelink communication. At the same time, the network device may further send second configuration information to the second terminal device, wherein the second configuration information is used for indicating that the second terminal device also adopts the first transmission mode to perform the sidelink communication, or may also indicate that the second terminal device to adopt other transmission modes to perform the sidelink communication.

Or, the network device has configured the transmission modes for both the first terminal device and the second terminal device, and the network device may send first configuration information to the first terminal device, wherein the first configuration information is used for indicating the first terminal device to adopt the first transmission mode to perform the sidelink communication. At the same time, the network device may further indicate the transmission mode of the second terminal device through the first configuration information, so that the first terminal device may send second configuration information to the second terminal device according to the first configuration information, and the second configuration information is used for indicating the transmission mode assigned by the network device to the second terminal device, for example, the second configuration information may indicate the second terminal device to adopt the first transmission mode to perform the sidelink communication or the second configuration information may also indicate the second terminal device to adopt other transmission modes to perform the sidelink communication.

It should be understood that various conditions and factors may be taken into consideration when the network device configures the transmission mode for the terminal device by the network device, and resource conflicts are to be avoided as much as possible according to actual applications. For example, here, taking the network device configuring the transmission mode for the terminal device group where the first terminal device is located as an example, if each terminal device in the terminal device group is located in the same cell, the network device may configure all terminal devices in the terminal device group to acquire resources of the sidelink by using the above-mentioned mode 1, or also by using the above-mentioned mode 2c or other modes. However, if the terminal devices in the terminal device group are located in different cells, and if the terminal devices in the terminal device group are still configured to acquire resources in the mode 1, because there is no resource coordination between cells, the network device corresponding to each group member may cause transmission resource conflicts when allocating transmission resources to the group members. Therefore, the network device may configure the terminal devices in the terminal device group to adopt mode 2b or mode 2d, and a group head may allocate transmission resources to each group member, thus avoiding transmission interference among users in the group. For another example, if the first terminal device is located outside the cell coverage area, and there is no other terminal device in the terminal device group, that is, the first terminal device does not perform unicast or multicast communication with other terminal devices, the network device may configure the first terminal device to acquire the sidelink resources by using mode 2a.

Therefore, the network device acquires the related information of one or more terminal devices, configures the transmission mode for the one or more terminal devices according to the information, and determines an appropriate transmission mode adopted by a terminal device to perform the sidelink communication according to the cell information of different terminal devices or the information of the terminal device group, so as to improve a resource utilization rate and data transmission efficiency.

Implementation two: the first terminal device selects a first transmission mode in multiple transmission modes.

Specifically, the first terminal device determines the first transmission mode in the multiple transmission modes according to a second message, and adopts the first transmission mode to perform the sidelink communication with other terminal devices. In the above, the second message may include related information of the first terminal device, for example, the second message may include third information, wherein the third information includes the transmission mode adopted by the first terminal device for performing the sidelink communication and/or a group identifier of the terminal device group.

It should be understood that the first terminal device determines the first transmission mode according to the second message, and the third information in the second message may include the transmission mode currently adopted by the first terminal device for performing the sidelink communication. For example, if the transmission mode included in the third information is the second transmission mode adopted by the first terminal device before determining the first transmission mode, the first terminal device may update the second transmission mode to the first transmission mode after determining the first transmission mode according to the second message, wherein the first transmission mode and the second transmission mode may be the same or different. For another example, if the transmission mode included in the third information is a transmission mode adopted by the first terminal device after determining the first transmission mode, that is, if the third information includes the first transmission mode, the first terminal device may determine the transmission mode to be adopted at the next moment according to the second message and update the first transmission mode currently used, where the first transmission mode and the updated transmission mode may be the same or different. For convenience of explanation, here, take the transmission mode included in the third information as the transmission mode adopted by the first terminal device before determining the first transmission mode as an example.

Optionally, the transmission mode currently adopted by the first terminal device for performing the sidelink communication included in the third information is the transmission mode adopted by the first terminal device in the terminal device group.

Optionally, the third information included in the second message is the related information of the first terminal device, and may further include other information, for example, the third information may further include group head information of the terminal device group where the first terminal device is located. The group head information may be used for indicating the group head in the terminal device group, wherein the group head is a terminal device with resource coordination, control, management or allocation function in the terminal device group. For example, if the first terminal device is not the group head in the terminal device group, the group head information may include identification information of the group head in the terminal device group; or, if the first terminal device is a group head in the terminal device group, the group head information may be used for indicating that the first terminal device is the group head in the terminal device group.

It should be understood that, similar to the concept of the terminal device group in Implementation one, the terminal device group in this implementation may further refer to the unicast link or multicast link where the first terminal device is located, or only include the first terminal device, and will not be described in detail here.

Optionally, for the terminal device group where the first terminal device is located, if the terminal device group only includes the first terminal device, that is, the first terminal device does not perform unicast or multicast communication with other terminal device, the terminal device may determine to adopting the above mode 1 to acquire sidelink resources, or if at the same time the first terminal device is also located outside the cell coverage area, the terminal device may also determine to adopt the mode 2a mode to acquire the sidelink resources, but implementations of the present disclosure are not limited to this.

Optionally, for the terminal device group where the first terminal device is located, if the terminal device group includes multiple terminal devices, the first terminal device may further determine the first transmission mode with reference to related information of another terminal device. For example, the first terminal device may be the group head in the terminal device group, wherein the group head may determine the transmission mode adopted by the group head according to the related information of group members, or may further determine the transmission modes adopted by other group members.

Here, taking the terminal device group including multiple terminal devices as an example, the first terminal device is any terminal device in the terminal device group, and a third terminal device is another one arbitrary terminal device. The first terminal device may determine the first transmission mode with reference to the related information of the third terminal device. Specifically, the second message may further include fourth information, wherein the fourth information includes at least one piece of the following information: identification information of the third terminal device, transmission mode adopted by the third terminal device for performing the sidelink communication, and second indication information, wherein the third terminal device is a terminal device other than the first terminal device. For example, the third terminal device may be any other terminal device in the same terminal device group as the first terminal device, wherein the first terminal device may be the group head and the third terminal device is any group member in the terminal device group.

Optionally, the method 200 may further include: the first terminal device receives fourth information sent by the third terminal device, wherein the fourth information may be carried in a sidelink transmission channel, for example, the sidelink transmission channel may be PSCCH or PSSCH.

The second indication information may be used for indicating cell information or coverage information corresponding to the third terminal device. For example, if the third terminal device is located outside the cell coverage area, the second indication information is used for indicating that the third terminal device is located outside the cell coverage area.

For another example, if the third terminal device is located within the cell coverage area, the second indication information includes the cell identification information of the cell where the third terminal device is located.

Alternatively, for another example, if the third terminal device is located outside the coverage area of the cell where the first terminal device is located, the second indication information is used for indicating that the third terminal device is located outside the coverage area of the cell where the first terminal device is located and/or the second indication information includes cell identification information of the cell where the third terminal device is located. Specifically, if the third terminal device is located outside the cell coverage area, that is the third terminal device is located outside the coverage area of the cell where the first terminal device is located, the first indication information may be used for indicating that the third terminal device is located outside the coverage area of the cell where the first terminal device is located or outside the cell coverage area. If the third terminal device is located within the cell coverage area but outside the coverage area of the cell where the first terminal device is located, the first indication information may be used for indicating that the third terminal device is located outside the coverage area of the cell where the first terminal device is located, or the first indication information may further include the cell identification information of the cell where the third terminal device is located, so that the first terminal device may determine the cell where the third terminal device is located.

For another example, if the third terminal device is located inside the coverage area of the cell where the first terminal device is located, the second indication information is used for indicating that the third terminal device is located in the cell where the first terminal device is located, or, the first indication may further include the cell identification information of the cell where the third terminal device is located, so that the first terminal device may determine the cell where the third terminal device is located.

It should be understood that the first terminal device may consider various conditions and factors to determine the first transmission mode by combining information of multiple terminal devices, and avoid resource conflicts as much as possible according to actual applications. In addition, the first terminal device may further configure transmission modes for other terminal devices while determining to adopt the first transmission mode. For example, if the first terminal device is the group head in the terminal device group, the first terminal device may further configure transmission modes of other terminal devices.

For example, if each terminal device in the terminal device group where the first terminal device is located is located in the same cell, the first terminal device may configure all terminal devices in the terminal device group to adopt the above mode 1, or adopt the above Mode 2c or other modes to acquire the resources of the sidelink. However, if the terminal devices in the terminal device group are located in different cells, and if the terminal devices in the terminal device group are still configured to adopt the mode 1 to acquire resources, because there is no resource coordination between cells, the network device corresponding to each group member may cause transmission resource conflicts when allocating transmission resources to the group members. Therefore, the first terminal device may configure the terminal devices in the terminal device group to adopt mode 2b or mode 2d, and the group head may allocate transmission resources to each group member, thus avoiding the transmission interference between users in the group.

It should be understood that if the first terminal device configures transmission modes for other terminal devices, the method 200 may further include: the first terminal device sends third configuration information to the third terminal device, wherein the third configuration information is used for indicating the transmission mode adopted by the third terminal device for performing the sidelink communication. For example, if the first terminal device may configure the third terminal device to adopt the first transmission mode as well, the third configuration information is used for indicating the third terminal device to adopt the first transmission mode to perform the sidelink communication; or, the first terminal device may further configure other transmission modes for the third terminal device, and implementations of the present disclosure are not limited to this.

Implementation three: the first terminal device is configured through another terminal device to adopt the first transmission mode.

Specifically, it can be seen from the combination of the first implementation and the second implementation above that the first terminal device is any terminal device, and the first terminal device may further receive a transmission mode sent by another terminal device. For example, the first terminal device receives fourth configuration information sent by a fourth terminal device, wherein the fourth configuration information is used for indicating the first transmission mode, and the first transmission mode may be configured for the first terminal device by the network device, and the first terminal is notified by the fourth configuration information sent by the fourth terminal device; or, the first transmission mode is configured by the fourth terminal device for the first terminal device, and is notified to the first terminal device through the fourth configuration information. The first terminal device determines the first transmission mode in the multiple transmission modes according to the fourth configuration information, and adopts the first transmission mode to perform the sidelink communication with another terminal device.

Combining the above implementations 1 and 2, the first terminal device may be any terminal device in the terminal device group where it is located. For example, the first terminal device may be a terminal device in the terminal device group except a group head, that is, a group member in the terminal device group, wherein the group head is a terminal device with resource coordination, management, control or allocation function in the terminal device group. The fourth terminal device is any another terminal device in the terminal device group, for example, the fourth terminal device may be the group head or a group member in the terminal device group.

Optionally, the method 200 may further include that the first terminal device sends fifth information to the network device or the first terminal device sends fifth information to the fourth terminal device then the fourth terminal device sends the fifth information to the network device, so that the network device may determine that the first terminal device adopts the first transmission mode according to the fifth information, or, the first terminal device sends the fifth information to the fourth terminal device, so that the fourth terminal device may determine that the first terminal device adopts the first transmission mode according to the fifth information, or, the first terminal device may send the fifth information to the network device or the fourth terminal device after determining the first transmission mode according to the fourth configuration information, and then the fifth information is used by the network device or the fourth terminal device for determining the transmission mode adopted by the first terminal device at the next moment.

Optionally, the fifth information sent by the first terminal device to the network device may be carried in, for example, uplink control information, MAC CE or RRC signaling, and implementations of the present disclosure are not limited to this.

Optionally, the fifth information sent by the first terminal device to the fourth terminal device may be carried in a sidelink transmission channel, for example, the sidelink transmission channel may be PSCCH or PSSCH.

It should be understood that the fifth information is related information of the first terminal device, and the fifth information may include at least one piece of the following information: the transmission mode adopted by the first terminal device for performing the sidelink communication, the group identifier of the terminal device group, and third indication information.

Optionally, the transmission mode adopted by the first terminal device for performing the sidelink communication included in the fifth information refers to the transmission mode adopted when sending the fifth information. For example, if the fifth information is sent before the first terminal device receives the fourth configuration information, the transmission mode indicated in the fifth information is a transmission mode currently used by the first terminal device, which may be the first transmission mode or other transmission modes. If the fifth information is sent after the first terminal device receives the fourth configuration information, the transmission mode indicated in the fifth information is a transmission mode currently used by the first terminal device, that is, the first transmission mode.

Optionally, the transmission mode adopted by the first terminal device for performing the sidelink communication included in the fifth information is the transmission mode adopted by the first terminal device in the terminal device group.

It should be understood that the group head information in the fifth information may be used for indicating the group head in the terminal device group, wherein the group head is the terminal device with resource coordination or allocation function in the terminal device group. For example, if the first terminal device is not the group head in the terminal device group, the group head information may include identification information of the group head in the terminal device group, or, if the first terminal device is the group head in the terminal device group, the group head information may be used for indicating that the first terminal device is the group head in the terminal device group, or the group head information may further include the identification information of the group head in the terminal device group where the first terminal device is located, and the network device or the fourth terminal device determines that the group head is the first terminal device.

It should be understood that, similar to Implementation one and Implementation two, the terminal device group in this implementation refers to the unicast link or multicast link where the first terminal device is located, or if the first terminal device does not belong to any unicast or multicast link, the terminal device group may only include the first terminal device, which is not described in detail here.

Optionally, the third indication information in the fifth information is used for indicating the cell information or coverage information corresponding to the first terminal device. For example, if the first terminal device is located outside the cell coverage area, the third indication information is used for indicating that the first terminal device is located outside the cell coverage area.

For another example, if the first terminal device is located within the cell coverage area, the third indication information includes the cell identification information of the cell where the first terminal device is located.

For another example, if the first terminal device is located outside the coverage area of the cell where the fourth terminal device is located, the third indication information is used for indicating that the first terminal device is located outside the coverage area of the cell where the fourth terminal device is located and/or the third indication information includes cell identification information of the cell where the first terminal device is located.

For another example, if the first terminal device is located within the coverage area of the cell where the fourth terminal device is located, the third indication information is used for indicating that the first terminal device is located in the cell where the fourth terminal device is located.

It should be understood that the first terminal device receives the fourth configuration information sent by the fourth terminal device, and the fourth configuration information is used for indicating the first terminal device to adopt the first transmission mode to perform the sidelink transmission, and the first transmission mode may be configured by the network device or the fourth terminal device. For the sake of brevity, the specific configuration process may refer to Implementation one and Implementation one, which will not be repeated here.

Therefore, in a method for determining a transmission mode in a sidelink in an implementation of the present disclosure, a transmission mode adopted by one or more terminal devices when performing a sidelink is configured by a network device or a terminal device, especially for multiple terminal devices in unicast or multicast communication, the appropriate transmission mode may be configured according to actual applications, thereby avoiding resource conflict and improving a resource utilization rate and a data transmission efficiency.

The method for determining a transmission mode in a sidelink according to an implementation of the present disclosure is described above in detail from the perspective of terminal device with reference to FIG. 1 to FIG. 3, and a method for determining the transmission mode in the sidelink according to an implementation of the present disclosure will be described below from the perspective of a network device with reference to FIG. 4.

Figure 4:
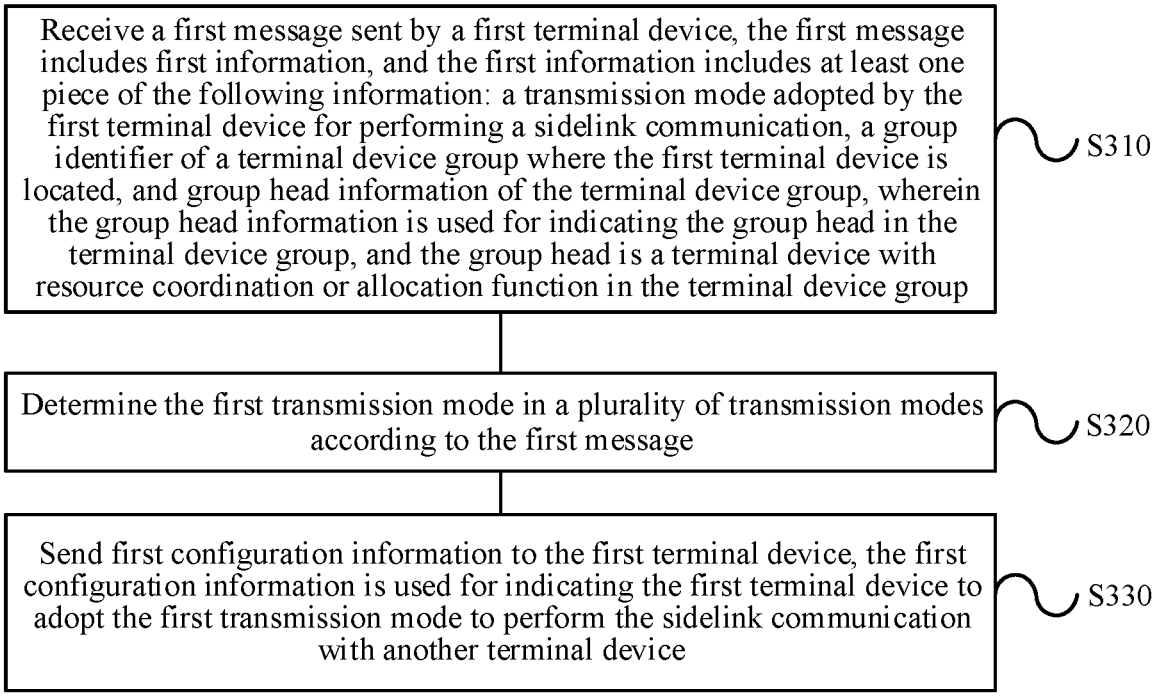
FIG. 4 is another schematic diagram of a method for determining a transmission mode in a sidelink according to an implementation of the present disclosure.

FIG. 4 shows a schematic flowchart of a method 300 for determining a transmission mode in a sidelink according to an implementation of the present disclosure. The method 300 may be performed by a network device. Specifically, for example, the network device may be the network device in FIG. 1 or FIG. 2. As shown in FIG. 4, the method 300 includes S310-S330. In S310, a first message sent by a first terminal device is received, the first message includes first information, wherein the first information includes at least one piece of the following information: a transmission mode adopted by the first terminal device for performing a sidelink communication, a group identifier of a terminal device group where the first terminal device is located, and group head information of the terminal device group, wherein the group head information is used for indicating the group head in the terminal device group, and the group head is a terminal device with resource coordination or allocation function in the terminal device group, in S320, a first transmission mode in multiple transmission modes is determined according to the first message; and in S330, first configuration information is sent to the first terminal device, wherein the first configuration information is used for indicating the first terminal device to adopt the first transmission mode to perform the sidelink communication with another terminal device.

Optionally, as an implementation, if the first terminal device is not a group head in the terminal device group, the group head information further includes identification information of the group head in the terminal device group; or, if the first terminal device is the group head in the terminal device group, the group head information is used for indicating that the first terminal device is the group head in the terminal device group.

Optionally, as an implementation, sending the first configuration information to the first terminal device includes: sending the first configuration information to a second terminal device, wherein the second terminal device is used for sending the first configuration information to the first terminal device, and the second terminal device is the group head in the terminal device group.

Optionally, as an implementation, the first message further includes second information, the second information includes at least one piece of the following information: identification information of a third terminal device, transmission mode adopted by the third terminal device for performing the sidelink communication, and first indication information, wherein the third terminal device is a terminal device other than the first terminal device in the terminal device group, and the first indication information is used for indicating a cell of the third terminal device.

Optionally, as an implementation, the first terminal device is the group head in the terminal device group.

Optionally, as an implementation, if the third terminal device is located outside the cell coverage area, the first indication information is used for indicating that the third terminal device is located outside the cell coverage area, or, if the third terminal device is located within the cell coverage area, the first indication information includes the cell identification information of the cell where the third terminal device is located; or, if the third terminal device is located outside the coverage area of the cell where the first terminal device is located, the first indication information is used for indicating that the third terminal device is located outside the coverage area of the cell where the first terminal device is located and/or the second indication information includes cell identification information of the cell where the third terminal device is located; or, if the third terminal device is located within the coverage area of the cell where the first terminal device is located, the first indication information is used for indicating that the third terminal device is located in the cell where the first terminal device is located.

Optionally, as an implementation, the method 300 further includes: second configuration information is sent to the third terminal device, wherein the second configuration information is used for indicating the third terminal device to adopt the first transmission mode to perform the sidelink communication.

Optionally, as an implementation, the first message is carried in uplink control information, MAC CE or RRC signaling.

Optionally, as an implementation, the first configuration information further includes at least one piece of the following information: group identification information of the terminal device group where the first terminal device is located, type information of multicast communication or broadcast communication, RAT class indication information and QoS attribute information.

Optionally, as an implementation, the first configuration information is carried in broadcast information, RRC signaling or downlink control information.

Therefore, in the method for determining the transmission mode in the sidelink in an implementation of the present disclosure, the network device may configure the transmission mode adopted by one or more terminal devices when performing the sidelink, especially for multiple terminal devices in unicast or multicast communication, the network device may configure an appropriate transmission mode according to the actual application, thereby avoiding resource conflicts and improving a resource utilization and a data transmission efficiency.

It should be understood that in various implementations of the present disclosure, magnitudes of sequence numbers of the various processes do not imply an order of execution of the various processes, which should be determined by their functions and internal logics, and should not constitute any limitation on implementation processes of the implementations of the present disclosure.

In addition, the term "and/or" in this specification describes only an association relation for describing associated objects and represents that three relations may exist. For example, A and/or B may represent the following three cases: only A exists, both A and B exist, and only B exists.

In addition, the symbol "/" in this document generally indicates that objects before and after the symbol "/" have an "or" relation.

The method for determining a transmission mode in a sidelink according to the implementations of the present disclosure is described in detail above with reference to FIG. 1 to FIG. 4. A terminal device and a network device according to implementations of the present disclosure will be described below with reference to FIG. 5 to FIG. 9.

Figure 5:
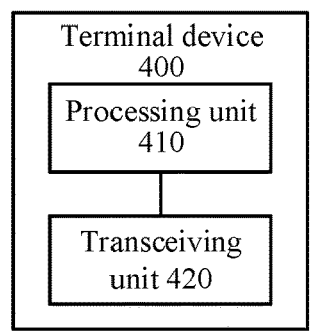
FIG. 5 is a schematic block diagram of a terminal device according to an implementation of the present disclosure.

As shown in FIG. 5, the terminal device 400 according to an implementation of the present disclosure includes a processing unit 410 and a transceiving unit 420. Specifically, the processing unit 410 is configured to: determine a first transmission mode in multiple transmission modes; and the transceiving unit 420 is configured to: perform a sidelink communication with another terminal terminal by adopting the first transmission mode.

Optionally, as an implementation, the transceiving unit 420 is further configured to receive first configuration information sent by a network device, wherein the first configuration information is used for indicating the first transmission mode; and the processing unit 410 is further configured to determine the first transmission mode in the multiple transmission modes according to the first configuration information.

Optionally, as an implementation, the transceiving unit 420 is further configured to send a first message to the network device, the first message includes first information, wherein the first information includes at least one piece of the following information: a transmission mode adopted by the terminal device for performing the sidelink communication, a group identifier of a terminal device group where the terminal device is located, and group head information of the terminal device group, wherein the group head information is used for indicating the group head in the terminal device group, wherein the group head is a terminal device having a resource coordination or allocation function in the terminal device group.

Optionally, as an implementation, if the terminal device is not the group head in the terminal device group, the group head information includes identification information of the group head in the terminal device group; or, if the terminal device is the group head in the terminal device group, the group head information is used for indicating that the terminal device is the group head in the terminal device group.

Optionally, as an implementation, the first message also includes second information, wherein the second information includes at least one piece of the following information: identification information of a second terminal device, transmission mode adopted by the second terminal device for performing the sidelink communication, and first indication information, wherein the second terminal device is a terminal device other than the terminal device in the terminal device group, and the first indication information is used for indicating cell information or coverage information corresponding to the second terminal device.

Optionally, as an implementation, if the second terminal device is located outside the cell coverage area, the first indication information is used for indicating that the second terminal device is located outside the cell coverage area, or, if the second terminal device is located within the cell coverage area, the first indication information includes the cell identification information of the cell where the second terminal device is located; or, if the second terminal device is located outside the coverage area of the cell where the terminal device is located, the first indication information is used for indicating that the second terminal device is located outside the coverage area of the cell where the terminal device is located and/or the first indication information includes cell identification information of the cell where the second terminal device is located; or, if the second terminal device is located within the coverage area of the cell where the terminal device is located, the first indication information is used for indicating that the second terminal device is located within the cell where the terminal device is located.

Optionally, as an implementation, the transceiving unit 420 is further configured to receive the second information sent by the second terminal device.

Optionally, as an implementation, the second information is carried in a sidelink transmission channel, which is a Physical Sidelink Control Channel (PSCCH) or a Physical Sidelink Shared Channel (PS SCH).

Optionally, as an implementation, the transceiving unit 420 is further configured to send second configuration information to the second terminal device, wherein the second configuration information is used for indicating the second terminal device to adopt the first transmission mode to perform the sidelink communication.

Optionally, as an implementation, the first message is carried in uplink control information, MAC CE or RRC signaling.

Optionally, as an implementation, the first configuration information further includes at least one piece of the following information: group identification information of the terminal device group where the terminal device is located, type information of multicast communication or broadcast communication, RAT class indication information and QoS attribute information.

Optionally, as an implementation, the first configuration information is carried in broadcast information, RRC signaling or downlink control information.

Optionally, as an implementation, the processing unit 410 is further configured to determine the first transmission mode in the multiple transmission modes according to a second message, wherein the second message includes third information, and the third information includes the transmission mode adopted by the terminal device for performing the sidelink communication and/or a group identifier of the terminal device group.

Optionally, as an implementation, the second message further includes fourth information, wherein the fourth information includes at least one piece of the following information: identification information of the third terminal device, transmission mode adopted by the third terminal device for performing the sidelink communication, and second indication information; wherein the third terminal device is a terminal device except the terminal device in the terminal device group, and the second indication information is used for indicating the cell information or coverage information corresponding to the third terminal device.

Optionally, as an implementation, if the third terminal device is located outside the cell coverage area, the second indication information is used for indicating that the third terminal device is located outside the cell coverage area; or, if the third terminal device is located within the cell coverage area, the second indication information includes the cell identification information of the cell where the third terminal device is located; or, if the third terminal device is located outside the coverage area of the cell where the terminal device is located, the second indication information is used for indicating that the third terminal device is located outside the coverage area of the cell where the terminal device is located and/or the second indication information includes cell identification information of the cell where the third terminal device is located; or, if the third terminal device is located within the coverage area of the cell where the terminal device is located, the second indication information is used for indicating that the third terminal device is located in the cell where the terminal device is located.

Optionally, as an implementation, the transceiving unit 420 is further configured to receive fourth information sent by the third terminal device.

Optionally, as an implementation, the fourth information is carried in a sidelink transmission channel, wherein the sidelink transmission channel is PSCCH or PSSCH.

Optionally, as an implementation, the transceiving unit 420 is further configured to send third configuration information to the third terminal device, wherein the third configuration information is used for indicating the third terminal device to adopt the first transmission mode to perform the sidelink communication.

Optionally, as an implementation, the transceiving unit 420 is further configured to receive fourth configuration information sent by a fourth terminal device, wherein the fourth configuration information is used for indicating the first transmission mode; and the processing unit 410 is further configured to determine the first transmission mode in the multiple transmission modes according to the fourth configuration information.

Optionally, as an implementation, the terminal device is a terminal device in the terminal device group except the group head, wherein the group head is a terminal device with resource coordination or allocation function in the terminal device group, and the fourth terminal device is the group head in the terminal device group.

Optionally, as an implementation, the transceiving unit 420 is further configured to send fifth information to the network device or the fourth terminal device, wherein the fifth information includes at least one piece of the following information: the transmission mode adopted by the terminal device for performing the sidelink communication, the group identifier of the terminal device group, and third indication information, wherein the third indication information is used for indicating cell information or coverage information corresponding to the terminal device.

Optionally, as an implementation, if the terminal device is located outside the cell coverage area, the third indication information is used for indicating that the terminal device is located outside the cell coverage area; or, if the terminal device is located within the cell coverage area, the third indication information includes the cell identification information of the cell where the terminal device is located; or, if the terminal device is located outside the coverage area of the cell where the fourth terminal device is located, the third indication information is used for indicating that the terminal device is located outside the coverage area of the cell where the fourth terminal device is located and/or the third indication information includes cell identification information of the cell where the terminal device is located; or, if the terminal device is located within the coverage area of the cell where the fourth terminal device is located, the third indication information is used for indicating that the terminal device is located within the cell where the fourth terminal device is located.

It should be understood that the terminal device 400 according to an implementation of the present disclosure may correspondingly perform the method 200 in an implementation of the present disclosure, and the above operations and/or functions and other operations and/or functions of each unit in the terminal device 400 are respectively for implementing each corresponding process of the terminal device of any of the methods in FIG. 1 to FIG. 4, which will not be repeated here for the sake of brevity.

Therefore, a terminal device in an implementation of the present disclosure may be configured with a transmission mode adopted when performing a sidelink through a network device or other terminal devices, and especially for multiple terminal devices in a unicast or multicast communication, an appropriate transmission mode may be configured according to actual applications, thereby avoiding resource conflict and improving a resource utilization rate and a data transmission efficiency.

Figure 6:
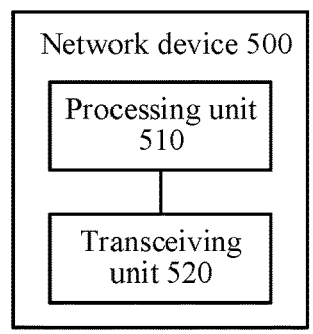
FIG. 6 is a schematic block diagram of a network device according to an implementation of the present disclosure.

As shown in FIG. 6, a network device 500 according to an implementation of the present disclosure includes a processing unit 510 and a transceiving unit 520. Specifically, the transceiving unit 520 is configured to receive a first message sent by a first terminal device, the first message includes first information, wherein the first information includes at least one piece of the following information: a transmission mode adopted by the first terminal device for performing a sidelink communication, a group identifier of the terminal device group where the first terminal device is located, and group head information of the terminal device group, wherein the group head information is used for indicating a group head in the terminal device group, the group head is a terminal device with resource coordination or allocation function in the terminal device group; and the processing unit 510 is configured to determine a first transmission mode in multiple transmission modes according to the first message; and the transceiving unit 520 is configured to send first configuration information to the first terminal device, wherein the first configuration information is used for indicating the first terminal device to adopt the first transmission mode to perform the sidelink communication with another terminal device.

Optionally, as an implementation, if the first terminal device is not a group head in the terminal device group, the group head information further includes the identification information of the group head in the terminal device group; or, if the first terminal device is the group head in the terminal device group, the group head information is used for indicating that the first terminal device is the group head in the terminal device group.

Optionally, as an implementation, the transceiving unit 520 is further configured to send the first configuration information to a second terminal device, wherein the second terminal device is the group head in the terminal device group.

Optionally, as an implementation, the first message further includes second information, and the second information includes at least one piece of the following information: identification information of a third terminal device, a transmission mode adopted by the third terminal device for performing the sidelink communication, and first indication information, wherein the third terminal device is a terminal device other than the first terminal device in the terminal device group, and the first indication information is used for indicating the cell of the third terminal device.

Optionally, as an implementation, the first terminal device is the group head in the terminal device group.

Optionally, as an implementation, if the third terminal device is located outside the cell coverage area, the first indication information is used for indicating that the third terminal device is located outside the cell coverage area; or, if the third terminal device is located within the cell coverage area, the first indication information includes the cell identification information of the cell where the third terminal device is located; or, if the third terminal device is located outside the coverage area of the cell where the first terminal device is located, the first indication information is used for indicating that the third terminal device is located outside the coverage area of the cell where the first terminal device is located and/or the second indication information includes cell identification information of the cell where the third terminal device is located; or, if the third terminal device is located within the coverage area of the cell where the first terminal device is located, the first indication information is used for indicating that the third terminal device is located in the cell where the first terminal device is located.

Optionally, as an implementation, the transceiving unit 520 is further configured to send second configuration information to the third terminal device, wherein the second configuration information is used for indicating the third terminal device to adopt the first transmission mode to perform the sidelink communication.

Optionally, as an implementation, the first message is carried in uplink control information, MAC CE or RRC signaling.

Optionally, as an implementation, the first configuration information further includes at least one piece of the following information: the group identification information of the terminal device group where the first terminal is located, type information of multicast communication or broadcast communication, RAT class indication information and QoS attribute information.

Optionally, as an implementation, the first configuration information is carried in broadcast information, RRC signaling or downlink control information.

It should be understood that the network device 500 according to an implementation of the present disclosure may correspondingly perform the method 300 in an implementation of the present disclosure, and the above and other operations and/or functions of each unit in the network device 500 are respectively for implementing each corresponding process of any of the methods in FIG. 1 to FIG. 4, which will not be repeated here for the sake of brevity.

Therefore, a network device in an implementation of this application may configure a transmission mode adopted when performing a sidelink for one or more terminal devices, especially for multiple terminal devices in a unicast or multicast communication, the network device may configure an appropriate transmission mode according to the actual applications, thereby avoiding resource conflict and improving a resource utilization rate and a data transmission efficiency.

Figure 7:
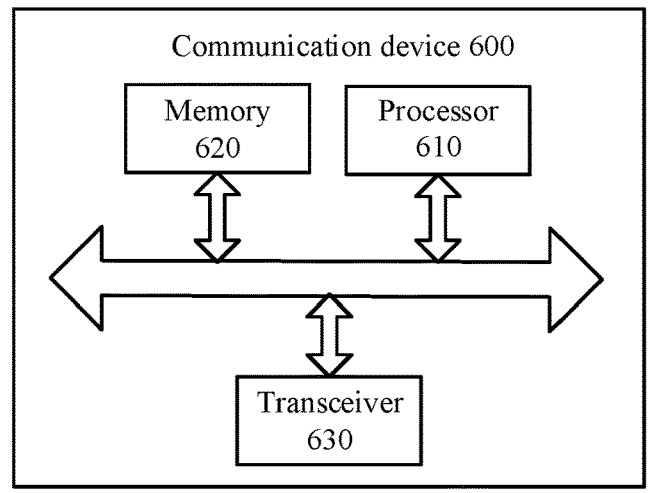
FIG. 7 is a schematic block diagram of a communication system according to an implementation of the present disclosure.

FIG. 7 is a schematic diagram of a structure of a communication device 600 according to an implementation of the present disclosure. A communication device 600 shown in FIG. 7 includes a processor 610, wherein the processor 610 may call and run a computer program from a memory to implement the method in an implementation of the present disclosure.

Optionally, as shown in FIG. 7, the communication device 600 may further include a memory 620, wherein the processor 610 may call and run a computer program from a memory 620 to implement the method in an implementation of the present disclosure.

In the above, the memory 620 may be a separate device independent of the processor 610 or may be integrated in the processor 610.

Optionally, as shown in FIG. 7, the communication device 600 may further include a transceiver 630, and the processor 610 may control the transceiver 630 to communicate with other devices. Specifically, the transceiver 630 may send information or data to other devices or receive information or data sent by other devices.

In the above, the transceiver 630 may include a transmitter and a receiver. The transceiver 630 may further include antennas, and the number of antennas may be one or more.

Optionally, the communication device 600 may be a network device of an implementation of the present disclosure, and the communication device 600 may implement the corresponding processes implemented by the network device in various methods of the implementations of the present disclosure, which will not be repeated here for brevity.

Optionally, the communication device 600 may be specifically a mobile terminal/terminal device of an implementation of the present disclosure, and the communication device 600 may implement the corresponding processes implemented by the mobile terminal/terminal device in the various methods of the implementations of the present disclosure, which will not be repeated here for brevity.

Figure 8:
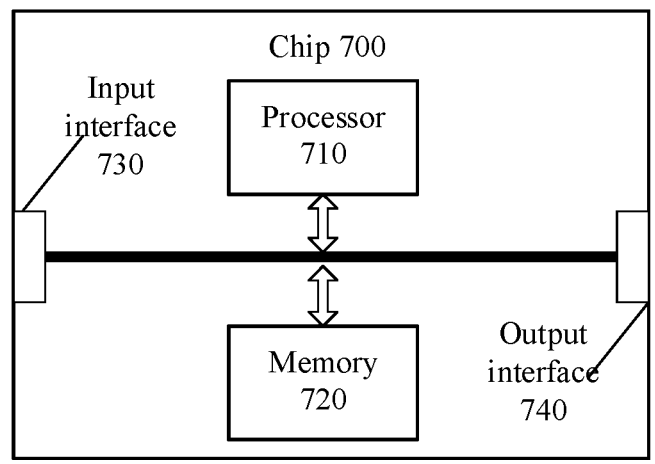
FIG. 8 is a schematic block diagram of a communication system according to an implementation of the present disclosure.

FIG. 8 is a schematic diagram of a structure of a chip according to an implementation of the present disclosure. A chip 700 shown in FIG. 8 includes a processor 710, wherein the processor 710 may call and run a computer program from a memory to implement the method in an implementation of the present disclosure.

Optionally, as shown in FIG. 8, the chip 700 may further include a memory 720, wherein the processor 710 may call and run a computer program from the memory 720 to implement the method in an implementation of the present disclosure.

In the above, the memory 720 may be a separate device independent of the processor 710 or may be integrated in the processor 710.

Optionally, the chip 700 may further include an input interface 730, wherein the processor 710 may control the input interface 730 to communicate with other devices or chips. Specifically, the processor 710 may acquire information or data sent by other devices or chips.

Optionally, the chip 700 may further include an output interface 740, wherein the processor 710 may control the output interface 740 to communicate with other devices or chips. Specifically, the processor 710 may output information or data to other devices or chips.

Optionally, the chip may be applied to a network device of an implementation of the present disclosure, and the chip may implement the corresponding processes implemented by the network device in various methods of the implementations of the present disclosure, which will not be repeated here for brevity.

Optionally, the chip may be applied to a mobile terminal/terminal device of an implementation of the present disclosure, and the chip may implement the corresponding processes implemented by the mobile terminal/terminal device in the various methods of the implementations of the present disclosure, which will not be repeated here for brevity.

It should be understood that the chip mentioned in the implementation of the present disclosure may be referred to as a system-level chip, a system chip, a chip system or a system-on-chip, etc.

Figure 9:
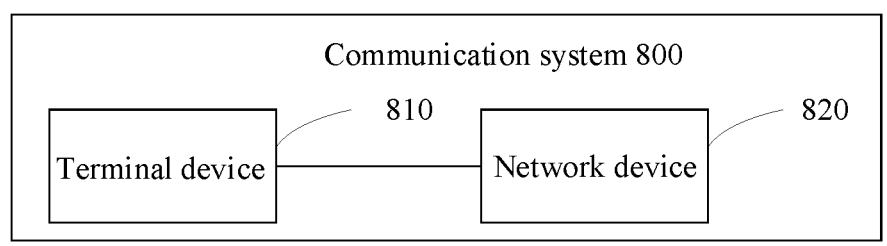
FIG. 9 is a schematic block diagram of a communication system provided by an implementation of the present disclosure.

FIG. 9 is a schematic block diagram of a communication system 800 according to an implementation of the present disclosure. As shown in FIG. 9, the communication system 800 may include a terminal device 810 and a network device 820.

Herein, the terminal device 810 may be configured to implement the corresponding functions implemented by the terminal device in the above-mentioned method, and the network device 820 may be configured to implement the corresponding functions implemented by the network device in the above-mentioned method, which will not be repeated here for brevity.

It should be understood that, the processor in this implementation of this application may be an integrated circuit chip having a signal processing capability. In an implementation process, the steps of the foregoing method implementations may be implemented by using an integrated logic circuit of hardware in the processor or instructions in a form of software. The processor may be a general purpose processor, a digital signal processor (Digital Signal Processing, DSP), an application specific integrated circuit (Application Specific Integrated Circuit, ASIC), a field programmable gate array (Field Programmable Gate Array, FPGA) or another programmable logic device, a discrete gate or a transistor logic device, or a discrete hardware component. The processor may implement or perform methods, steps and logical block diagrams disclosed in this implementation of this application. The general purpose processor may be a microprocessor, or the processor may be any conventional processor or the like. The steps of the method disclosed with reference to this implementation of this application may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It may be understood that, the memory in this implementation of this application may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memory in the systems and methods described in this specification is aimed at including but being not limited to these and any memory of another proper type.

It should be understood that, the foregoing memory is an example for illustration and should not be construed as limiting. For example, optionally, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in the implementations of the present disclosure are intended to include, but are not limited to, these and any other suitable types of memories.

An implementation of the present disclosure further provides a computer readable storage medium configured to store a computer program.

Optionally, the computer readable storage medium may be applied to a network device of an implementation of the present disclosure, and the computer program enables the computer to perform the corresponding processes implemented by the network device in various methods of the implementations of the present disclosure, which will not be repeated here for brevity.

Optionally, the computer readable storage medium may be applied to a mobile terminal/terminal device of the implementation of the present disclosure, and the computer program enables the computer to perform the corresponding processes implemented by the mobile terminal/terminal device in various methods of the implementations of the present disclosure, which will not be repeated here for brevity.

An implementation of the present disclosure further provides a computer program product including computer program instructions.

Optionally, the computer program product may be applied to a network device of an implementation of the present disclosure, and the computer program instructions enable a computer to perform the corresponding processes implemented by the network device in various methods of the implementations of the present disclosure, which will not be repeated here for brevity.

Optionally, the computer program product may be applied to a mobile terminal/terminal device of an implementation of the present disclosure, and the computer program instructions enable the computer to perform the corresponding processes implemented by the mobile terminal/terminal device in various methods of the implementations of the present disclosure, which will not be repeated here for brevity.

An implementation of the present disclosure further provides a computer program.

Optionally, the computer program may be applied to a network device of an implementation of the present disclosure. When the computer program is run on a computer, the computer is enabled to perform the corresponding processes implemented by the network device in various methods of the implementations of the present disclosure, which will not be repeated here for brevity.

Optionally, the computer program may be applied to a mobile terminal/terminal device of an implementation of the present disclosure. When the computer program is run on a computer, the computer is enabled to perform the corresponding processes implemented by the mobile terminal/terminal device in various methods of the implementations of the present disclosure, which will not be repeated here for brevity.

Those of ordinary skill in the art will recognize that the exemplary elements and algorithm acts described in combination with the implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for enabling a computer device (which may be a personal computer, a server, or a network device and the like) to perform all or part of the acts of the method described in various implementations of the present disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What is claimed is:

1. A method for determining a transmission mode of a sidelink, comprising:
   sending, by a first terminal device, a first message to a network device, wherein the first message comprises group identifier information of a terminal device group where the first terminal device is located, or identification information of a second terminal device, wherein the second terminal device is a terminal device which performs unicast communication with the first terminal device;
   receiving, by the first terminal device, first configuration information sent by the network device, wherein the first configuration information is used for indicating a first transmission mode;
   determining, by the first terminal device, the first transmission mode in a plurality of transmission modes based on the first configuration information; and
   adopting, by the first terminal device, the first transmission mode to perform a sidelink communication with another terminal device,
   wherein the first configuration information comprises: type information of unicast communication, multicast communication or broadcast communication, Quality of Service (QoS) attribute information, and the group identification information of the terminal device group where the first terminal is located,
   wherein the transmission mode comprises: mode 1 or mode 2, wherein the mode 1 is that the network device allocates transmission resources for the first terminal device, and the mode 2 is that the terminal device selects the transmission resources randomly or by sensing.

2. The method of claim 1, wherein if the first terminal device is not a group head in the terminal device group, group head information comprises identification information of the group head in the terminal device group; or
   if the first terminal device is the group head in the terminal device group, the group head information is used for indicating that the first terminal device is the group head in the terminal device group.

3. The method of claim 1, wherein if the second terminal device is located outside a cell coverage area, first indication information is used for indicating that the second terminal device is located outside the cell coverage area; or
   if the second terminal device is located within the cell coverage area, the first indication information comprises cell identification information of a cell where the second terminal device is located; or
   if the second terminal device is located outside a coverage area of a cell where the first terminal device is located, the first indication information is used for indicating that the second terminal device is located outside the coverage area of the cell where the first terminal device is located and/or the first indication information comprises the cell identification information of the cell where the second terminal device is located; or
   if the second terminal device is located within the coverage area of the cell where the first terminal device is located, the first indication information is used for indicating that the second terminal device is located in the cell where the first terminal device is located.

4. The method of claim 3, further comprising:
   receiving, by the first terminal device, second information sent by the second terminal device.

5. The method of claim 4, wherein the second information is carried in a sidelink transmission channel, and the sidelink transmission channel is a Physical Sidelink Control Channel (PSCCH) or a Physical Sidelink Shared Channel (PSSCH).

6. The method of claim 1, further comprising:
   sending, by the first terminal device, second configuration information to the second terminal device, wherein the second configuration information is used for indicating the second terminal device to adopt the first transmission mode to perform the sidelink communication.

7. The method of claim 1, wherein the first message is carried in uplink control information, a Media Access Control Control Element (MAC CE), or a Radio Resource Control (RRC) signaling.

8. The method of claim 1, wherein the first configuration information further comprises
the identification information of the second terminal device which performs unicast communication with the first terminal device.

9. The method of claim 1, wherein the first configuration information is carried in broadcast information, or RRC signaling.

10. A method for determining a transmission mode of a sidelink, comprising:
receiving a first message sent by a first terminal device, wherein the first message comprises group identifier information of a terminal device group where the first terminal device is located, or identification information of a second terminal device, wherein the second terminal device is a terminal device which performs unicast communication with the first terminal device;
determining a first transmission mode in a plurality of transmission modes according to the first message; and
sending first configuration information to the first terminal device, wherein the first configuration information is used for indicating the first terminal device to adopt the first transmission mode to perform the sidelink communication with another terminal device,
wherein the first configuration information comprises: type information of unicast communication, multicast communication or broadcast communication, Quality of Service (QoS) attribute information, and the group identification information of the terminal device group where the first terminal is located,
wherein the transmission mode comprises: mode 1 or mode 2, wherein the mode 1 is that the network device allocates transmission resources for the first terminal device, and the mode 2 is that the terminal device selects the transmission resources randomly or by sensing.

11. The method of claim 10, wherein the first message is carried in uplink control information, a Media Access Control Control Element (MAC CE), or a Radio Resource Control (RRC) signaling.

12. The method of claim 10, wherein the first configuration information comprises at least one piece of following pieces of information:
the identification information of the second terminal device which performs unicast communication with the first terminal device.

13. The method of claim 10, wherein the first configuration information is carried in broadcast information, or RRC signaling.

14. A terminal device, comprising: a processor and a transceiver, wherein
the transceiver is configured to send a first message to a network device, wherein the first message comprises group identifier information of a terminal device group where the terminal device is located, or identification information of a second terminal device, wherein the second terminal device is a terminal device which performs unicast communication with the first terminal device, and receive first configuration information sent by the network device, wherein the first configuration information is used for indicating a first transmission mode; and
the processor is configured to determine the first transmission mode in a plurality of transmission modes based on the first configuration information;
wherein the transceiver is further configured to adopt the first transmission mode to perform a sidelink communication with another terminal device,
wherein the first configuration information comprises: type information of unicast communication, multicast communication or broadcast communication, Quality of Service (QoS) attribute information, and the group identification information of the terminal device group where the first terminal is located,
wherein the transmission mode comprises: mode 1 or mode 2, wherein the mode 1 is that the network device allocates transmission resources for the first terminal device, and the mode 2 is that the terminal device selects the transmission resources randomly or by sensing.

15. The terminal device of claim 14, wherein if the terminal device is not a group head in the terminal device group, group head information comprises identification information of the group head in the terminal device group; or
if the terminal device is the group head in the terminal device group, the group head information is used for indicating that the terminal device is the group head in the terminal device group.

16. The terminal device of claim 14, wherein if the second terminal device is located outside a cell coverage area, first indication information is used for indicating that the second terminal device is located outside the cell coverage area; or
if the second terminal device is located within the cell coverage area, the first indication information comprises cell identification information of a cell where the second terminal device is located; or
if the second terminal device is located outside a coverage area of a cell where the terminal device is located, the first indication information is used for indicating that the second terminal device is located outside the coverage area of the cell where the terminal device is located and/or the first indication information comprises the cell identification information of the cell where the second terminal device is located; or
if the second terminal device is located within the coverage area of the cell where the terminal device is located, the first indication information is used for indicating that the second terminal device is located in the cell where the terminal device is located.

17. The terminal device of claim 16, wherein the transceiver is further configured to:
receive second information sent by the second terminal device.

18. The terminal device of claim 17, wherein the second information is carried in a sidelink transmission channel, and the sidelink transmission channel is a Physical Sidelink Control Channel (PSCCH) or a Physical Sidelink Shared Channel (PSSCH).

19. The terminal device of claim 14, wherein the transceiver is further configured to:
send second configuration information to the second terminal device, wherein the second configuration information is used for indicating the second terminal device to adopt the first transmission mode to perform the sidelink communication.

20. The terminal device of claim 14, wherein the first message is carried in uplink control information, a Media Access Control Control Element (MAC CE), or a Radio Resource Control (RRC) signaling.

21. The terminal device of claim 14, wherein the first configuration information further comprises at least one piece of following information:
the identification information of the second terminal device which performs unicast communication with the first terminal device.

22. The terminal device of claim 14, wherein the first configuration information is carried in broadcast information, or RRC signaling.

23. A network device, comprising: a processor and a transceiver, wherein
the transceiver is configured to receive a first message sent by a first terminal device, wherein the first message comprises group identifier information of a terminal device group where the first terminal device is located, or identification information of a second terminal device, wherein the second terminal device is a terminal device which performs unicast communication with the first terminal device; and
the processor is configured to determine a first transmission mode in a plurality of transmission modes according to the first message;
wherein the transceiver is configured to send first configuration information to the first terminal device, wherein the first configuration information is used for indicating the first terminal device to adopt the first transmission mode to perform a sidelink communication with another terminal device,
wherein the first configuration information comprises: type information of unicast communication, multicast communication or broadcast communication, Quality of Service (QoS) attribute information, and the group identification information of the terminal device group where the first terminal is located,
wherein the transmission mode comprises: mode 1 or mode 2, wherein the mode 1 is that the network device allocates transmission resources for the first terminal device, and the mode 2 is that the terminal device selects the transmission resources randomly or by sensing.

24. The network device of claim 23, wherein the first message is carried in uplink control information, a Media Access Control Control Element (MAC CE), or a Radio Resource Control (RRC) signaling.

25. The network device of claim 23, wherein the first configuration information further comprises
the identification information of the second terminal device which performs unicast communication with the first terminal device.

26. The network device of claim 23, wherein the first configuration information is carried in broadcast information, or RRC signaling.

* * * * *